UNITED STATES PATENT OFFICE.

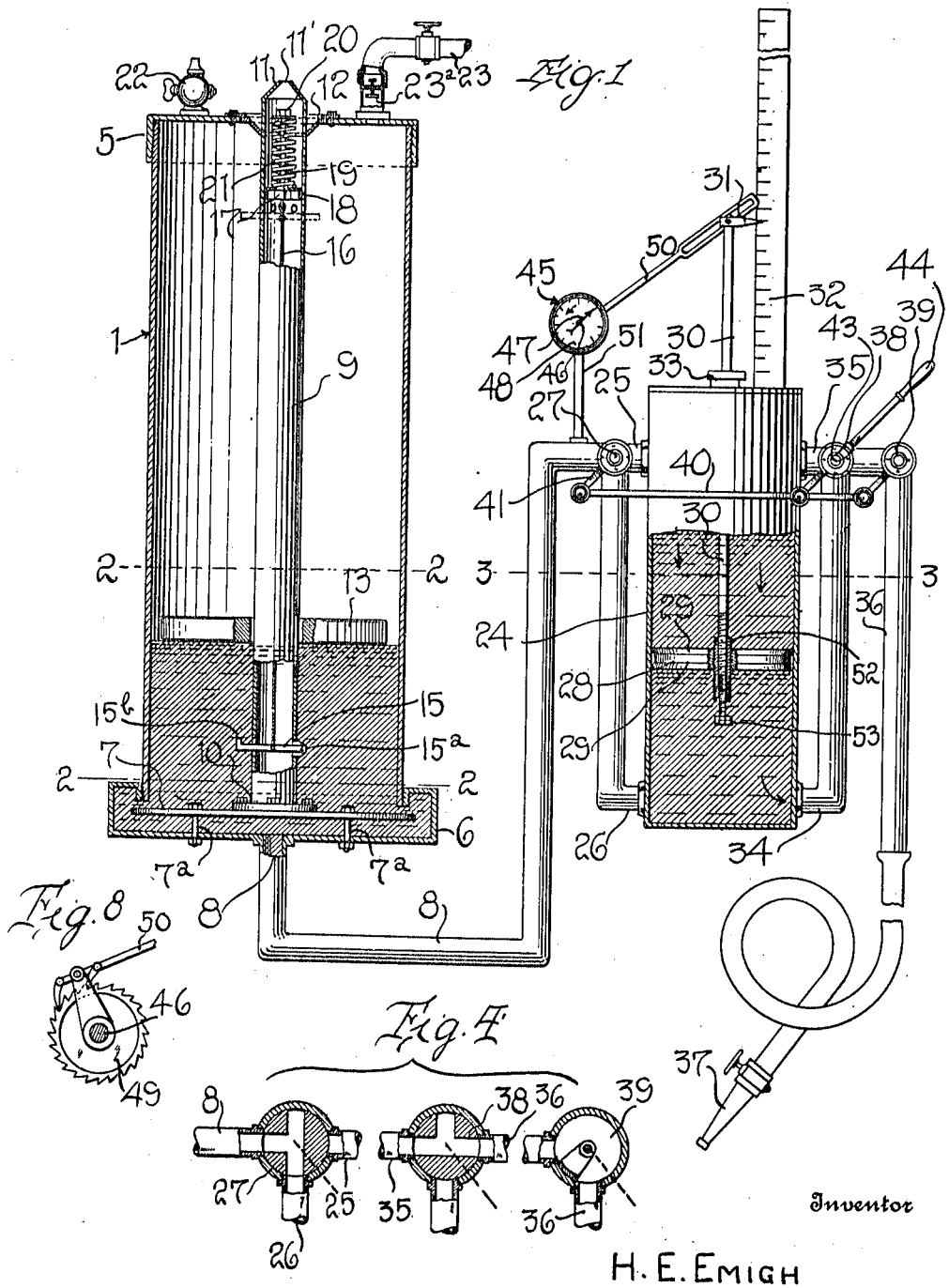

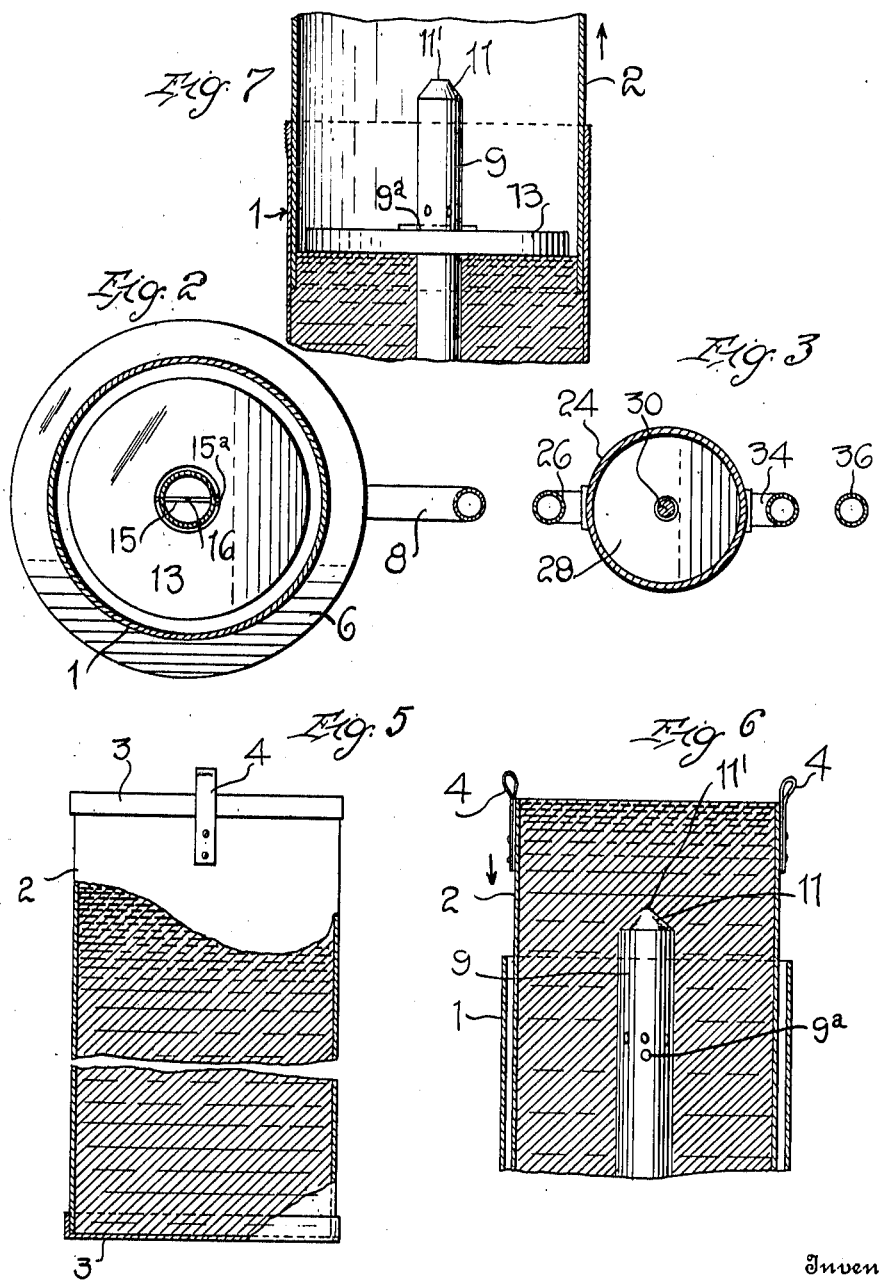

HOWARD E. EMIGH, OF SANTA CRUZ, CALIFORNIA.

GREASE-GUN.

1,241,725.   Specification of Letters Patent.   Patented Oct. 2, 1917.

Application filed October 30, 1915. Serial No. 58,891.

*To all whom it may concern:*

Be it known that I, HOWARD E. EMIGH, a citizen of the United States, residing at Santa Cruz, in the county of Santa Cruz and State of California, have invented certain new and useful Improvements in Grease-Guns, of which the following is a specification, reference being had to the accompanying drawings.

This invention relates to lubricating devices, and more particularly to that class of lubricating devices in which lubricant is forced out from the lubricant container by fluid pressure.

The primary object of my invention is to provide a "grease gun" or lubricating device which is peculiarly adapted for injecting cup grease, transmission grease, or similar lubricant into the transmission and differential mechanism of automobiles.

A further object of the invention is the provision in connection with a lubricant container having means for forcing lubricant therefrom, of a measuring device whereby the amount of lubricant ejected from the machine may be indicated not only as regards the total amount of lubricant passing through the machine but also as to the amount used at any one application of lubricant so that thereby the amount of lubricant used, as for instance in a transmission gear or applied to a differential of an automobile, may be accurately measured.

Still another object of the invention is the provision, in a lubricating device, of a baffle plate disposed in proximity with the outlet opening of the lubricant container, so arranged that nearly all the lubricant will leave the tank or container before air blows out through the exit pipe.

A further object is to provide means whereby air pressure may be applied to the lubricant so that a relatively heavy lubricant in the form of grease may be forced out quickly from the container whether the lubricant is warm or cold, and this lubricating grease may be either filled into cartons, into a grease gun, or into mechanism designed to be lubricated.

A further object of the invention is to provide means whereby the pressure of compressed fluid within the lubricant container and above the lubricant may be automatically relieved when a certain amount of lubricant has been forced out.

A further object of the invention is to so construct the lubricant container that cartons containing grease may be readily disposed within the container and then the casing of the carton withdrawn to leave the lubricant within the container.

A still further object of the invention is the provision of a measuring device used in connection with the compressed air actuated lubricant ejecting container, the operation of the measuring device being controlled by the pressure within the container itself, and in this connection to provide manually actuatable valves whereby the pressure of air within the lubricant container may be caused to constantly reciprocate the piston of the measuring device for as long as it is desired to eject lubricant therefrom.

Still another object is to provide in connection with a measuring device having a piston, a scale showing at all times the position of the piston so that the stroke of the piston may be stopped when sufficient lubricant has been ejected and also to provide means for registering the total number of strokes made by the piston.

Still another object of the invention is to provide means whereby each stroke of the piston will give an exact measure, which stroke can be adjusted or regulated to any degree desired.

Another object is to provide a measuring apparatus in the form of a trap which will prevent any chance of the lubricant leaking back.

With these and other objects in view, as will be later stated, I have devised the construction illustrated in the accompanying drawings.

In these drawings:

Figure 1 is a vertical section through the lubricant container and a partial section through the measuring cylinder and the pipe connections being illustrated in full lines;

Fig. 2 is a section on the line 2—2 of Fig. 1;

Fig. 3 is a section on the line 3—3 of Fig. 1;

Fig. 4 is a vertical section through the valves 27, 38 and 39 to show the position of these valves when the lower portion of the measuring device is being filled and lubricant is being ejected from the upper portion of the measuring cylinder;

Fig. 5 is a sectional view through a carton constructed in accordance with my invention, this carton being particularly adapted for use with the lubricating construction shown;

Fig. 6 is a view showing the manner in which the carton is inserted in the container;

Fig. 7 is a like view to Fig. 6, showing the manner in which the carton is withdrawn;

Fig. 8 is an elevation of the ratchet mechanism whereby the pointer 47 is operated.

The container 1 in which the lubricant is intended to be placed is preferably in the form of a cylinder. Before describing the detailed construction of this container and the means for forcing lubricant therefrom, I will describe the carton illustrated in Fig. 5 in which the lubricant is primarily contained in transportation. This carton or cartridge is circular in form and of any desired length but preferably consists of a body 2 the ends of which are closed by caps 3, these caps being readily removable from the body of the container. Attached to the body of the container on each side are the loops 4. The body of the container and the caps are preferably made of paper, but may be made of other material such as pasteboard or tin. In inserting the carton into the cylinder the carton is lowered therein by means of the finger loops 4, the caps 3 being first removed as illustrated in Fig. 5 and when the carton has been fully lowered into this cylinder the body 2 is withdrawn, leaving the lubricant within the cylinder or container 1.

The cylinder 1 of the container is preferably formed of sheet metal, though it may be formed of any suitable material, and the upper end is closed by a removable cap 5, this cap being annular in form for a reason to be stated later. The lower end of cylinder 1 preferably has screw threaded engagement with a base 6, the diameter of which is greater than that of the cylinder. Mounted below the cylinder and spaced abov the base 6 is a baffle plate 7 which also has a diameter slightly greater than that of the cylinder 1 but less than the diameter of the base 6 so as to provide a passageway around the side edges of the baffle plate into the base and underneath the baffle plate. The baffle plate as illustrated is mounted upon bolts or other suitable devices 7ª which hold the baffle plate in rigid position but in spaced relation to the base so that the contents of the cylinder may readily pass around the plate. The base 6 is provided with a central opening which discharges into an outlet pipe 8.

Centrally disposed within the container 1 and having its lower end closed by the baffle plate is a vertically disposed tube 9. The lower end of this tube is shown as being formed with a base flange 10 which is bolted to the baffle plate. The tube is longer than the cylinder and projects through the cap 5 and the upper end of the tube is conical in form to provide a pointed extremity 11, this extremity being formed with a central opening 11′. In order to prevent the leakage of air from the container 1 around the tube 9 at the cap 6, I preferably provide the cap with any suitable packing means engaging the tube 9 and as illustrated this packing means comprises the cup-shaped packing member 12 which is secured to the cap 5 around the central opening thereof and bears against the tube 9. It will be obvious that the pressure of air within the container 1 will act to force this packing member tightly against the tube 9 and thus prevent the escape of air.

Disposed within the container 1 is a follower or float 13. This float is annular in form and has a diameter substantially less than the interior diameter of the container 1 while the diameter of the central opening of the float or follower is sufficiently greater than the tube 9 as to permit the float or follower to rise or fall through the cylinder without impediment. Coacting with the follower 13 is a relief valve 17 which is normally held to a valve seat 18 supported in the upper portion of the tube 9. The valve 17 is formed with the upwardly extending stem 19 which at its upper end is provided with a head 20 surrounding the stem 19 and bearing against the valve stem at one end and at its other end against the head 20 is a spring 21 which normally acts to hold the valve to its seat. A flexible connection 16 is attached to the under side of the valve and extends downward through the tube 9 and at its lower end is connected to a lever 15. This lever extends out through slots in the tube 9 and the lever is pivoted at 15ª to a bracket formed upon the tube 9 while the other end of the lever is upwardly turned as at 15ᵇ so as to be engaged by the follower 13 when the latter reaches the upturned end of the lever. When the follower falls a predetermined distance it strikes the upturned end of the lever 15 and forces the lever downward and this through the connection 16 opens the valve whereupon pressure of air within the container 1 is relieved through the opening 11′. This air pressure may also be relieved by the manually operable valve or cock 22. Air is forced into the container through a pipe 23 which is preferably flexible and provided with a check valve 23ª.

The operation of this portion of my invention will be obvious. When the container has been emptied of lubricant and it is desired to insert a new carton, the cap 5 is removed. The caps 3 on the container 2 are removed and the carton is supported by means of the loops 4 or other suitable means above the container. The point 11 of the tube 9 easily penetrates the thick lubricant or grease as illustrated in Fig. 6, and the carton is gradually lowered into the container. When the carton has been entirely disposed within the container and it is desired to withdraw the body of the carton leaving the grease within the container the follower 13 is replaced upon the tube 9 and is supported against any upward movement by a pin passed through the openings 9ª formed in the tube 9 (see Fig. 7). This prevents the follower from rising. The body of the carton is then withdrawn by means of the loops 4, the follower 13 acting to prevent the withdrawal of the lubricant. When the carton has been entirely withdrawn the pin which has been passed through the openings 9ª is removed and the follower is then at liberty to move downward as the grease is discharged. The cap 5 is then applied to the container 1 and connections are made to the source of compressed air or other fluid. As the compressed air is admitted to the container it forces the lubricant out through the opening 8 until such time as the follower has descended sufficiently far to open the valve 17 when the machine will automatically stop. It will be seen that the lubricant cannot flow back into the container 1 because of there being a pressure of air against the upper surface of the lubricant and against the follower 13. The baffle plate 7 compels the air to pass through a relatively deep body of grease collected between the periphery of the baffle plate and the pipe 8 before the air can possibly be forced out through the pipe 8. If there were no baffle plate the compressed air would be liable to be forced directly outward through the pipe 8 merely forming a bore through the lubricant. This is not possible with the construction illustrated. Furthermore, this forcing air through the seal of pipe 8 is prevented by the automatic means for relieving the air pressure before the grease has entirely left the container and while there still remains sufficient lubricant in the bottom of the container to entirely close and seal the exit pipe 8. While I have shown the pipe 9 as of relatively large diameter in order that the position and construction of the valve may be shown, it is to be understood that this pipe might be small in diameter relatively to the diameter of the container itself, and thus would have very little effect in retarding the insertion of the lubricant into the container, and furthermore, I wish it understood that I do not wish to be limited to the particular manner of mounting the baffle, the particular manner of providing for the automatic relieving of the air pressure, nor the particular formation of the cap 5, as many of the details of construction illustrated may be changed without departing from the spirit of the invention.

In order to provide for measuring the quantity of grease or lubricant ejected from the container 1 either at any one lubricating operation or to give the total of lubricant ejected during a certain period, I provide the measuring mechanism illustrated on the right hand of Fig. 1. This mechanism is so constructed that it is operated by the compressed air or other fluid behind the lubricant in the container 1 and is automatic in its operation to a certain extent. This mechanism includes a cylinder 24 having an inlet pipe 25 at its upper end and an inlet pipe 26 entering the lower end. The inlet pipe 26 opens into the pipe 25 at the junction of this pipe 25 with the pipe 8. A valve 27 is disposed at this junction.

It will be noted from Fig. 1 that the pipe 8 extends downward from the head 6 of cylinder 1, then extends laterally and upward and enters the upper end of the cylinder 24 by means of the pipe 25 and that the pipe 26 extends upward from the lower end of the cylinder 24 and intersects the pipe 8 at the junction of the pipe 8 with the pipe 25. Thus when the piston 29 is at the lowest limit of its movement and the upper portion of the cylinder is filled with grease, the grease or other lubricant cannot flow back through the pipe 25 and 8, while when the piston 28 is in its uppermost position and the cylinder is filled with grease, the grease cannot flow back into the pipe 8. Furthermore when the piston 29 is at its lowest limit of movement, the valve 27 has closed, thus holding grease in the pipe 26 and preventing the forcing of the grease by the downward descent of the piston out through the pipe 26 into the pipe 8. It will be obvious, of course, that the pressure of air behind the piston 13 will prevent any back flow of grease through the pipe 8.

Disposed within the container is a piston 28 having suitable packing rings 29 and carrying a piston rod 30 which extends upward through the upper end of the cylinder and carries upon its upper end the index pointer 31 which extends over a scale 32 mounted upon the upper end of the cylinder, this scale 32 being graduated. Preferably the piston rod 30 passes through a stuffing box 33 which prevents the outlet of lubricant between the piston rod and the stuffing box.

From the lower end of the cylinder 24 extends an outlet pipe 34 while from the upper end of the cylinder extends an outlet pipe 35. The pipes 34 and 35 both open into a discharge pipe 36 which is provided with a flexible hose having a valved nozzle 37. Disposed at the junction of the pipes 34 and 35 with the pipe 36 is a valve 38, and disposed in the pipe 36 is a valve 39. These valves are all connected for common operation by a link bar 40, each of the valves being provided with an arm 41 pivotally connected to this link bar. The stem 43 of the valve 38 is provided with a handle 44 and when this handle is actuated all of the several valves 27, 38 and 39 will be actuated. As illustrated in Fig. 4, the valve 27 is a three-way valve. The valve 38 is also a three-way valve. The valve 39 is an ordinary cut-off valve. When the valve 27 is turned in one position it will connect the pipe 8 with the pipe 26 but when turned in the other position it will connect the pipe 8 with pipe 25. The valve 38 when turned into one position will connect the outlet pipe 34 with the pipe 36 and when turned in the other position will connect the outlet pipe 35 with the pipe 36. The valve 39 is so formed that when the valves 27 and 38 are turned into either extremes of their movement the valve 39 will be opened, but that when the valves 27 and 38 are moved to a middle position the valve 39 will be closed.

For the purpose of measuring the total amount of lubricant or other material passing through the measuring device and ejected from the container 1, I provide a register designated generally 45, which as illustrated is provided with a shaft 46 and a pointer 47, this hand 47 operating over a dial 48. The piston rod 30 is so connected to the shaft 46 that each movement of the piston rod in one or the other direction will be indicated upon the dial. Simply for purposes of illustration and not that I wish to be limited to this construction, I have illustrated the shaft 46 as being provided with a ratchet wheel 49 and actuated by an ordinary double pawl mechanism mounted upon a rod 50 which rod is pivotally mounted upon a bracket on shaft 46 or concentric thereto and is pivotally connected to the upper end of the pointer 31. I have illustrated the dial 45 as mounted upon a standard 51 extending upward from the pipe 25, but it will be understood that any suitable support may be provided.

For the purpose of delicately regulating the extent of movement of the piston 28 so that each stroke of the piston shall give an exact measure, I have provided the piston with a bushing 52 which is adjustable upon the rod 30 and through the piston and have provided a screw 53 in the lower end of the bushing. Thus by adjusting the bushing 52 the upward stroke of the piston may be stopped at any predetermined distance from the top of the cylinder, while by adjusting the screw 53 the downward stroke of the piston may be adjusted. I do not wish to be limited, however, to this exact means for regulating the stroke of the piston though I have found this means to be particularly simple and thoroughly effective.

The operation of the measuring mechanism is as follows: In Fig. 1 it is assumed that the valve 27 is arranged so that communication is established between the pipe 8 and the upper portion of the cylinder 24 through the pipe 25 and that thus the piston 28 is descending and forcing the contents of the lower portion of the cylinder out through the pipe 34. The valve 38 is therefore disposed in a position to connect the pipe 34 with the discharge pipe 36 and the valve 39 is opened to permit such discharge. The compressed air behind the lubricant contained within the container 1 will force the lubricant out and into the upper portion of the cylinder 24 until the piston 28 has reached the lower end of its stroke. During this time the pointer 31 has been moving over the scale 32 and indicates to the operator just how much lubricant has been discharged. When the piston 28 has reached the lower end of its stroke, if more lubricant is desired to be discharged, the handle 44 is shifted, thus turning the valves 27 and 38 to the position shown in Fig. 4. The valve 39 also turns but it turns from one open position to another open position. With the valves arranged as shown in Fig. 4, communication will be established between the pipe 8 and the pipe 26 and the piston will be forced upward and as the valve 38 will be turned to the position shown in Fig. 4 the lubricant contained in the cylinder 24 above the piston will be forced out through the pipe 35 into the pipe 36 and so discharged. When sufficient lubricant has been discharged the handle 44 is actuated to shift the valves 27 and 38 to a median position and this shifting will turn the valve 39 to a position where it will cut off the passage of lubricant through the pipe 36.

It will be seen that the pointer 31 operating over the scale 32 will indicate not only the full stroke of the piston 28 in either direction but will also indicate the discharge of any portion of the contents of the cylinder 24. The register 45 may be arranged so that the pointer 47 will move one space upon each stroke of the piston in either direction and in this case the fractional strokes of the piston will be indicated upon the scale 32 by the pointer 31. It will be seen that the space above and below the piston is always filled with lubricant and therefore if the piston be in a middle position the action of throwing the valves 27 and 38 to either of their extreme positions, that is, the open positions, will cause the contents at one or the other end of the cylinder to be discharged and the amount of this discharge may be readily changed upon the scale 32. It is evident that as long as there is pressure on the lubricant in the cylinder or container 1 the movement of the piston will continue until it strikes either the top or the bottom of the cylinder 24 and it is also obvious that means might be provided for automatically shifting the valves 27 and 38, if desirable, instead of manually shifting these valves at the end of each stroke of the piston. In practice, however, I have found that it is best to have these valves manually shiftable as thus there is no danger of an operator going away and leaving the machine to pump lubricant and then forgetting that the machine is operating thereby wasting lubricant. With the construction illustrated it is impossible to pump or force out more than the contents of the measuring cylinder 24 unless the valves are again shifted. It will of course be understood that the cylinder 24 has a predetermined capacity, as for instance, one gallon, five gallons, or some other standard measure. It is not necessary, however, that the container 1 shall have any standard capacity, but of course such container should have a capacity larger than that of the measuring cylinder 24. It will be seen that the container 1 acts as a pump whose movement is governed by movement of the piston in the measuring piston or cylinder 24 and that on the other hand the pressure within the container 1 is the means whereby the piston of the measuring chamber or cylinder 24 is operated.

While I have described my invention as peculiarly applicable to devices for discharging and measuring lubricant, I wish it understood that it may be also used for a large variety of other purposes and particularly for the discharging and measurement of liquids or semi-liquids. While I have described the details of my construction, I wish it distinctly understood that these details may be modified in many ways without in any way departing from the spirit of the invention.

Having thus described my invention, what I claim is:

1. The combination with a container having a discharge orifice in its lower end, the container at its lower end being laterally enlarged concentric to the orifice, of a baffle plate disposed over and in spaced relation to the orifice and having a diameter greater than the internal diameter of the body of the container but less than the internal diameter of the container at its bottom, and means for admitting fluid under pressure to the upper portion of the container.

2. A container for liquid or semi-liquid substance having a discharge orifice, means for admitting fluid under pressure to one end of the container to force the material therein out through said discharge orifice, and means acting automatically upon a discharge of the contents to a predetermined extent to relieve the pressure of the fluid within the container.

3. A container for liquid or semi-liquid substances having a discharge orifice at its lower end, means for admitting fluid under pressure to the upper end of the container, and a pressure relief valve actuated by a descent of the contents of the container below a certain predetermined point.

4. A container for liquid or semi-liquid substances having a discharge orifice in its lower end, means for admitting fluid under pressure to the upper end of the container, and means for reducing the pressure of the fluid within the container before the contents of the container have been entirely discharged through the orifice.

5. A container for delivering liquid or semi-liquid substances having a discharge orifice in its bottom, a baffle plate disposed over the orifice in spaced relation thereto and larger than the orifice, means for admitting fluid under pressure to the upper portion of the container to cause the discharge of the contents thereof, and means for reducing the pressure of the fluid within the container before the contents thereof have been entirely discharged.

6. A container for delivering liquid or semi-liquid substances having a discharge orifice in its bottom, means for admitting fluid under pressure to the upper portion of the container above the contents thereof, a relief valve, a follower adapted to rest upon the contents of the container and descend as the contents are discharged, and means operatively connected to the relief valve to open the latter when engaged by the follower upon a fall of the follower beyond a predetermined point.

7. A container for delivering fluid or semi-fluid substances having an orifice in its bottom, means for admitting fluid under pressure to the upper portion of the container, a pressure relief valve in the upper portion of the container, a follower adapted to rest upon the contents of the container and descend therewith as the contents are discharged, and a lever disposed in the lower portion of the container and operatively connected to the valve and adapted to be engaged by the follower when the follower has sunk to a predetermined low level.

8. A container for delivering liquid or semi-liquid substances having an orifice in its bottom, means for admitting fluid under pressure into the upper portion of the container above the contents thereof, a tubular guide rod extending upward through the container and having a normally closed relief valve in its upper end, a member movably mounted upon the lower end of said guide tube and projecting exteriorly thereto and operatively connected to the relief valve, and a follower adapted to rest upon the contents of the container and sink therewith to thereby engage the member and cause the opening of the relief valve when the contents of the container have sunk to a predetermined level.

9. A lubricant delivering container having a discharge orifice in its lower end, a removable cap closing the upper end of the container, a guide tube extending upward through the container and extending through an opening in the relief cap and having a pointed end, a removable valve disposed in the guide tube, a follower loosely mounted upon the guide tube, means disposed at the lower end of the guide tube adapted to be engaged by the follower and open said relief valve when the follower has sunk below a predetermined point, and means on the upper end of the guide tube for preventing upward movement of the follower beyond a predetermined point, and said means being removable to permit the follower to be removed from the container to permit the insertion of a lubricant carton and permit the follower to be again replaced upon the guide tube to thereby hold the lubricant in place while the carton is raised.

10. A container for containing liquid or semi-liquid substances having a discharge orifice in its bottom, means for admitting fluid under pressure into the upper portion of the container above the contents thereof, a tubular guide extending upward through the container and having a normally closed relief valve in its upper end, a spring holding said valve closed, a lever pivotally mounted upon the lower end of the guide tube, the guide tube being slotted to permit the projection of the lever to the exterior of the guide tube, an operative connection between the lever and said valve, a depression of the lever acting to open the valve, and a follower adapted to rest upon the contents of the container and sink therewith to thereby engage the lever to cause the opening of the relief valve when the contents of the container have sunk to a predetermined level.

11. A lubricant delivering container having a discharge orifice in its lower end, an annular cap closing the upper end of the container, a guide tube extending upward through the container and extending through an opening in the cap, flexible packing secured to the margin of said opening in the cap and extending downward and into engagement with the guide tube, a relief valve in the guide tube, a follower loosely mounted upon the guide tube, and means disposed at the lower end of the guide tube adapted to be engaged by the follower and open the relief valve when the follower is sunk below a predetermined point.

12. The combination with a measuring chamber, of a container for delivering liquid or semi-liquid substances to the measuring chamber, having a discharge orifice, a pipe extending downward from the discharge orifice of the container and extending upward above the level of the bottom of the container and then extending laterally into the upper end of the measuring chamber, a pipe extending downward from the last named end of the first named pipe and entering the lower end of the measuring chamber, a discharge pipe connected to the upper and lower ends of the measuring chamber, a valve shiftable to close one of the inlets to the measuring chamber and open the other, a valve to close one of the outlets from the measuring chamber and open the other, said valves being operatively conected to each other for simultaneous movement, and means for discharging the contents of the measuring chamber.

13. The combination with a container for liquid or semi-liquid substance, said container having a discharge orifice in its lower end and means for admitting fluid under pressure into its upper end, and a follower disposed within the container and adapted to rest upon the substance contained therein and urged downward by said compressed fluid to cause the discharge of the substance within the container, of a measuring chamber, a member movable in opposite directions through said chamber by the pressure of liquid on one side or the other of the member, and means for admitting the liquid or semi-liquid contents of the container into one end or the other of said measuring chamber and discharging said liquid or semi-liquid substance from the opposite end of the chamber from that to which it is admitted, and means for indicating the movement of said member within the measuring chamber.

In testimony whereof I hereunto affix my signature in the presence of witnesses.

HOWARD E. EMIGH.

Witnesses:
  F. G. WILSON,
  NELLIE WILSON,
  A. J. THORP.